United States Patent
Muramaki et al.

(10) Patent No.: US 7,524,479 B2
(45) Date of Patent: Apr. 28, 2009

(54) METHOD FOR PRODUCING VAPOR GROWN CARBON FIBER

(75) Inventors: Kazuo Muramaki, Kanagawa (JP);
Yoshihisa Sakamoto, Kanagawa (JP);
Ryuji Yamamoto, Kanagawa (JP);
Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 510 days.

(21) Appl. No.: 10/475,777

(22) PCT Filed: Jun. 26, 2002

(86) PCT No.: PCT/JP02/06402

§ 371 (c)(1),
(2), (4) Date: Oct. 23, 2003

(87) PCT Pub. No.: WO03/002789

PCT Pub. Date: Jan. 9, 2003

(65) Prior Publication Data

US 2004/0136895 A1 Jul. 15, 2004

Related U.S. Application Data

(60) Provisional application No. 60/303,793, filed on Jul. 10, 2001, provisional application No. 60/362,447, filed on Mar. 8, 2002.

(30) Foreign Application Priority Data

Jun. 28, 2001 (JP) ............................. 2001-195801
Feb. 13, 2002 (JP) ............................. 2002-034883

(51) Int. Cl.
*D01F 9/12* (2006.01)

(52) U.S. Cl. ................... 423/447.8; 423/447.4

(58) Field of Classification Search ............. 423/445 R, 423/447.1, 447.3, 447.4, 447.5, 447.7, 447.8
See application file for complete search history.

(56) References Cited

U.S. PATENT DOCUMENTS

| 4,572,813 A | 2/1986 | Arakawa |
| 4,663,230 A | 5/1987 | Tennent |
| 5,413,773 A | 5/1995 | Tibbetts et al. |

FOREIGN PATENT DOCUMENTS

| JP | 58-22571 B2 | 5/1983 |
| JP | 60-215816 A | 10/1985 |
| JP | 62053419 A | 3/1987 |
| JP | 62-238826 A | 10/1987 |
| JP | 63-92726 A | 4/1988 |
| JP | 3-14623 A | 1/1991 |
| JP | 6-21377 B2 | 3/1994 |
| JP | 09078360 A | 3/1997 |
| JP | 2778434 B2 | 5/1998 |
| WO | WO 90/07023 A1 | 6/1990 |

OTHER PUBLICATIONS

Patent Abstracts of Japan, vol. 1997, No. 07, abstracting JP-A-09 078360 of Mar. 25, 1997.
Patent Abstracts of Japan, vol. 011, No. 246 (C-439), abstracting JP-A-62 053419 of Mar. 9, 1987.

*Primary Examiner*—Edward M Johnson
(74) *Attorney, Agent, or Firm*—Sughrue Mion, PLLC

(57) ABSTRACT

A method for producing vapor grown carbon, including mixing a raw material gas containing an organic compound and an organo-transition metallic compound preliminarily heated preferably to a temperature of 100 to 450° C. with a carrier gas heated preferably to a temperature of 700 to 1,600° C., and introducing the resultant gas mixture into a carbon fiber production zone, wherein preferably a mixture of an aromatic compound and acetylene, ethylene, or butadiene is used as an organic compound. The method can include dissolving the transition metallic compound in a solvent, atomizing the resultant solution into fine droplets, evaporating the solvent in the droplets to thereby obtain fine particles of the transition metal compound, and introducing the drifting particles with an organic compound gas into the carbon fiber production zone. Vapor grown carbon fiber is thereby produced.

19 Claims, 2 Drawing Sheets

METHOD FOR PRODUCING VAPOR GROWN CARBON FIBER

CROSS-REFERENCE TO RELATED APPLICATIONS

This application is based on the provisions of 35 U.S.C. Article 111(a) with claiming the benefit of filing dates of U.S. provisional application Ser. No. 60/303,793 filed on Jul. 10, 2001 and U.S. provisional application Ser. No. 60/362,447 filed on Mar. 8, 2002 under the provisions of 35 U.S.C. 111(b), pursuant to 35 U.S.C. Article 119(e)(1).

TECHNICAL FIELD

The present invention relates to a method for producing fine carbon fiber through vapor-phase thermal decomposition of an organic compound. Particularly, the present invention relates to a method for producing vapor grown carbon fiber, in which conditions for producing carbon fibers are uniformized such that the outer diameter and the like of the produced fibers do not vary widely, to vapor grown carbon fiber produced thereby, and to an apparatus for producing vapor grown carbon fiber. More particularly, the present invention relates to a method for efficiently producing carbon fiber by feeding fine particles of a transition metallic compound, which serve as catalyst during production of carbon fiber, into a carbon fiber production furnace in a specific manner. The carbon fiber produced through the method of the present invention is excellent in the uniformity of the diameter of fibers, and is suitable as a filler used in composite materials such as resin- or rubber-based composite materials, a semiconductor material, a catalyst material, and a field emission material.

BACKGROUND ART

Vapor grown carbon fiber is produced through thermal decomposition of an organic compound in the presence of fine particles of Fe, Ni, etc., which serves as a catalyst. Such fine particles of Fe, Ni, etc. are typically generated through thermal decomposition of an organo-transition metallic compound. An aromatic compound such as benzene, which is typically used as a raw material of carbon fiber, is fed to a carbon fiber production furnace together with a carrier gas such as hydrogen. The resultant carbon fiber filaments are quite minute, since they are grown in the production furnace within a very short period of time.

Conventionally, vapor grown carbon fiber has typically been produced by means of a method in which an organic compound, an organo-transition metallic compound, and a carrier gas are fed directly to a carbon fiber production furnace which has been heated to a predetermined temperature. However, various improved methods for producing carbon fiber have replaced this method.

For example, there has been proposed a method in which an organo-transition metallic compound is decomposed in a thermal decomposition zone, the decomposition zone being separated from a carbon fiber production zone, and the resultant decomposed gas is introduced into the carbon fiber production zone; a gas of an organic compound and a carrier gas are fed to the production zone, to thereby thermally decompose the organic compound; and carbon fiber is grown in the production zone in the presence of fine particles of Fe, Ni, etc. serving as a catalyst, which have been generated through thermal decomposition of the organo-transition metallic compound (Japanese Patent Publication (kokoku) No. 6-21377).

There has also been proposed a method in which an organic compound solution in which an organo-transition metallic compound is dissolved is gasified in the presence of a carrier gas, to thereby produce a gas mixture in which the ratio of the organo-transition metallic compound to the organic compound is equal to the corresponding ratio of these compounds in the solution; and the gas mixture is caused to react at a high temperature in a heating zone, to thereby produce vapor grown carbon fiber (Japanese Patent Publication (kokoku) No. 4-13448 (U.S. Pat. No. 4,572,813)).

Vapor grown carbon fiber, by virtue of its small diameter, is employed as a filler used in composite materials such as resin- or rubber-based composite materials; and as a semiconductor material; a catalyst material; and a field emission material. Vapor grown carbon fiber desirably has a uniform and very small outer diameter. Carbon fiber is generally grown around fine particles of Fe, Ni, etc. serving as a catalyst (i.e., nucleui). Therefore, in order to produce carbon fiber of uniform outer diameter, firstly, fine particles of uniform size must be formed. Secondly, variation in carbon fiber production conditions should be minimized in a carbon fiber production zone, the production conditions including the concentration of fine particles, the concentration of a product obtained through decomposition of an organic compound, temperature, and the residence time of the decomposed product in the carbon fiber production zone.

Fine particles of a transition metal such as Fe or Ni which are generated through decomposition of an organo-transition metallic compound become large with passage of time. Therefore, in order to produce fine carbon fiber, the residence time of the fine particles in a carbon fiber production zone must be reduced, to thereby prevent growth of the fine particles. When the residence time of the fine particles is long, the particles may become large and prevent production of carbon fiber.

In general, since a carbon fiber production furnace is heated through application of heat from the outside, maintenance of uniform temperature inside the furnace is difficult. Particularly when the diameter of the production furnace (reactor tube) is increased in order to increase productivity of carbon fiber, elevating the temperature of a raw material gas, etc. requires a long time, and the temperature of the inside of the furnace tends to differ from portion to portion.

Measures proposed by the aforementioned publications, Japanese Patent Publication (kokoku) Nos. 6-21377 and 4-13448 (U.S. Pat. No. 4,572,813) to solve the above problems still require some improvements.

Accordingly, the first object of the present invention lies in obtaining carbon fiber having a substantially uniform outer diameter by means of a method in which a raw material gas is mixed with a carrier gas which has been heated to high temperature, and the resultant gas mixture is fed to a carbon fiber production furnace (carbon fiber production zone), whereby both the time required for raising the temperature of the raw material gas in the furnace and the residence time of the raw material gas in the furnace are shortened, and uniform carbon fiber production conditions in the furnace are attained.

As above described, the vapor grown carbon fiber is produced through thermal decomposition of an organic compound in the presence of fine particles of a transition metal such as Fe or Ni, which serve as catalyst. The formation mechanism of carbon fiber is as follows: carbon generated through thermal decomposition of an organic compound is deposited around fine particles of a transition metal, and carbon fiber is formed through extension of the resultant network of carbon atoms. Therefore, in order to produce fine carbon fiber, the fine particles must be reduced in size. Production of fine carbon fiber can be attained by shortening growth time, while employing very fine particles of a transition metal.

Vapor grown carbon fiber is used, as an electrically conductive filler or a thermally conductive filler, in synthetic resins, paints, lithium batteries, etc. Furthermore, vapor grown carbon fiber is used in, among other materials, electrode materials of a fuel cell, a secondary battery, a capacitor, etc.; and electron emission materials of a field emission display (FED). Vapor grown carbon fiber used in such materials desirably has a very small diameter.

Conventionally, there have been proposed various methods for causing fine particles of a transition metal to be present in a carbon fiber production furnace (a reaction furnace).

For example, there has been proposed a method in which a transition metallic compound is thermally decomposed in advance to thereby obtain fine particles of the transition metal, and the resultant fine particles are caused to be present in a reaction furnace (Japanese Patent Publication (kokoku) No. 58-22571).

There has also been proposed a method in which an organo-transition metallic compound having an evaporation temperature (gasification temperature) lower than its thermal decomposition temperature, such as ferrocene, is gasified and fed into a reaction furnace, and the gasified compound is thermally decomposed in the furnace, to thereby generate fine particles of the transition metal (Japanese Patent Publication (kokoku) No. 62-49363 (U.S. Pat. No. 4,572,813)).

There has also been proposed a method in which a transition metallic compound is dissolved in a solvent, the resultant solution is sprayed into a reaction furnace, and the compound is decomposed in the reaction furnace, to thereby generate fine particles of the transition metal (Japanese Patent No. 2778434).

Very fine particles of a transition metal are difficult to obtain through the aforementioned conventional techniques. The size of fine particles of a transition metal obtained through pulverization has its limit of the minimization, and the particles tend to aggregate to form secondary particles; i.e., the particles increase in size. Meanwhile, even when fine particles of a transition metal are obtained through gasification and thermal decomposition of an organo-transition metallic compound such as ferrocene, the resultant particles tend to aggregate in the range of thermal decomposition temperature, and the particles increase in size.

When a transition metallic compound is gasified and then fed into a reaction furnace, the compound must be evaporated at a temperature lower than its thermal decomposition temperature. Therefore, transition metallic compounds which may be employed are limited. A compound such as ferrocene satisfies the above requirement; i.e., the evaporation temperature must be lower than the thermal decomposition temperature, but involves economical problems due to its high cost. When a transition metallic compound is gasified and then fed into a reaction furnace, variation in size of the resultant particles tends to occur. In this case, since the compound is fed into the reaction furnace while assuming a molecular state, thermal decomposition of the compound occurs easily, and most of the compound is thermally decomposed in the vicinity of the inlet of the furnace. The resultant metallic particles aggregate while flowing in the gas, and become too large to serve as catalyst. Therefore, the production efficiency (yield) of fine carbon fiber is low.

A method in which a transition metallic compound is dissolved in a solvent, the resultant solution is atomized into fine droplets, and the resultant droplets are fed into a reaction furnace is advantageous, in that a wide variety of transition metallic compounds can be employed by selection of an appropriate solvent. However, the method involves a problem that carbon fiber of uniform diameter cannot be produced, since an employed solvent is evaporated in a reaction furnace, and the temperature of the interior of the furnace cannot be maintained uniform, due to the effect of latent heat of evaporation of the solvent.

Accordingly, the second object of the present invention is to provide a method for efficiently producing fine vapor grown carbon fiber, in which a wide variety of transition metallic compounds, serving as catalyst, can be employed.

DISCLOSURE OF THE INVENTION

The present inventors have made an intensive study in order to solve the above problems. As a result, the present inventors have found that carbon fiber uniform without varying widely in the diameter and the like can be produced by mixing a heated carrier gas and a raw material gas containing an organic compound and an organo-transition metallic compound serving as raw materials of carbon fiber; and introducing the resultant gas mixture into a carbon fiber production zone, and that it is especially preferable to conduct the mixing of the gases in a line mixer and to use non-aromatic unsaturated compound as an organic compound, which has a great heating value in thermal decomposition.

Moreover, the present inventors have found that vapor grown carbon fine fiber can be efficiently produced by a method in which a transition metallic compound is dissolved in a solvent, the resultant solution is atomized into fine droplets, the solvent in the droplets is evaporated to thereby obtain fine particles of the transition metal compound, the drifting particles are introduced together with an organic compound-gas into the carbon fiber production zone, and a wide variety of transition metallic compounds can be employed as a catalyst.

That is, the present invention provides a method for producing vapor grown carbon fiber as described in the following (1) to (18), the vapor grown carbon fiber as; described in the following (19) to (22), an apparatus for producing the vapor grown carbon fiber as described in the following (23) to (31) and a composition comprising the vapor grown carbon fiber as described in the following (32).

(1) A method for producing vapor grown carbon fiber using an organo-transition metallic compound as a catalyst and an organic compound as a carbon source, wherein a heated carrier gas is mixed with a raw material gas containing the organic compound as a carbon source or with a raw material gas containing the organo-transition metallic compound and the organic compound, and introducing the resultant gas mixture into a carbon fiber production zone.

(2) The method for producing vapor grown carbon fiber as described in (1) above, comprising mixing a heated carrier gas and a raw material gas containing an organic compound and an organo-transition metallic compound serving as raw materials of carbon fiber; and introducing the resultant gas mixture into a carbon fiber production zone.

(3) The method for producing vapor grown carbon fiber as described in (2) above, wherein the carrier gas and the raw material gas are mixed under stirring.

(4) The method for producing vapor grown carbon fiber as described in (2) or (3) above, wherein the raw material gas is preliminarily heated to 100 to 450° C., and the carrier gas is heated to 700 to 1,600° C.

(5) The method for producing vapor grown carbon fiber as described in (3) or (4) above, wherein the raw material gas and the carrier gas are mixed under stirring by use of a line mixer.

(6) The method for producing vapor grown carbon fiber as described in any one of (2) to (5) above, wherein the organic compound is an aromatic compound.

(7) The method for producing vapor grown carbon fiber as described in any one of (2) to (6) above, wherein the organic compound is a mixture of an aromatic compound and acetylene, ethylene, or butadiene.

(8) The method for producing vapor grown carbon fiber as described in (7) above, wherein the amount of acetylene, ethylene, or butadiene is 90 mass % or less.

(9) The method for producing vapor grown carbon fiber as described in (1) above, comprising dissolving a transition metallic compound in a solvent; atomizing the resultant solution into fine droplets; evaporating the solvent in the droplets to thereby obtain fine particles of the transition metallic compound; and feeding the fine particles into a carbon fiber production zone together with a gas of an organic compound, with the particles being dispersed in the gas.

(10) The method for producing vapor grown carbon fiber as described in (1) above, comprising dissolving a transition metallic compound in a solvent; atomizing the resultant solution into fine droplets; evaporating the solvent in the droplets to thereby obtain fine particles of the transition metallic compound; and feeding the fine particles into a carbon fiber production zone together with a gas of an organic compound and a gas of a transition metallic compound, with the particles being dispersed in the gasses.

(11) The method for producing vapor grown carbon fiber as described in (9) or (10) above, wherein each of the droplets contains two or more transition metallic compounds having different thermal decomposition temperatures or different temperatures of hydrogen-induced reduction.

(12) The method for producing vapor grown carbon fiber as described in (9) or (10) above, wherein the droplets comprise two or more types of droplets containing transition metallic compounds having different thermal decomposition temperatures or different temperatures of hydrogen-induced reduction.

(13) The method for producing vapor grown carbon fiber as described in any one of (9) to (12) above, wherein the amount of the transition metallic compound in each of the droplets (or the total amount of two or more transition metallic compounds in each of the droplets) is 0.01 to 40 mass %.

(14) The method for producing vapor grown carbon fiber as described in any one of (9) to (13) above, wherein the transition metallic compound is one species selected from among an oxide, a hydroxide, a sulfide, a fluoride, a fluoro-complex, a chloride, a chloro-complex, a bromide, an iodide, a perchlorate, a nitrate, a sulfate double salt, a carbonate, a cyano-complex, and a metallocene of iron, nickel, cobalt, molybdenum, platinum, palladium, rhodium, ruthenium, titanium, or vanadium.

(15) The method for producing vapor grown carbon fiber as described in any one of (9) to (14) above, wherein the transition metallic compound has a thermal decomposition temperature lower than its evaporation temperature.

(16) The method for producing vapor grown carbon fiber as described in any one of (9) to (14) above, wherein a method for atomizing the transition metallic compound solution into droplets is at least one species selected from among a pressure atomization method, a two-fluid atomization method, a centrifugal atomization method, a vibration method, an ultrasonic method, an acoustic atomization method, and an electrical atomization method.

(17) The method for producing vapor grown carbon fiber as described in any-one of (9) to (16) above, wherein the solvent employed for dissolving the transition metallic compound is water, an organic solvent, or a water-containing organic solvent.

(18) The method for producing vapor grown carbon fiber as described in any one of (9) to (17) above, wherein the solvent employed for dissolving the transition metallic compound is at least one species selected from among water, methanol, ethanol, propanol, benzene, toluene, xylene, acetone, ether, and hexane.

(19) A vapor grown carbon fiber produced through a method as described in any one of (1) to (8) above.

(20) The vapor grown carbon fiber as described in (19) above, which has a diameter of 0.001 to 0.5 μm, and an aspect ratio of 10 to 15,000.

(21) The vapor grown carbon fiber produced through a production method as described in any one of (9) to (18) above.

(22) The vapor grown carbon fiber as described in (21) above, which has an outer diameter of 1 to 500 nm and a length of 0.5 to 100 μm.

(23) A vapor grown carbon fiber production apparatus comprising a furnace 2 for preliminarily heating a raw material gas of carbon fiber; a furnace 1 for heating a carrier gas; a carbon fiber production furnace 4; a passage 3 for mixing the raw material gas and the carrier gas; and a passage for feeding the resultant gas mixture into the carbon fiber production furnace.

(24) A vapor grown carbon fiber production apparatus comprising a furnace 2 for preliminarily heating a raw material gas of carbon fiber; a furnace 1 for heating a carrier gas; a carbon fiber production furnace 4; a passage 3 for mixing the raw material gas and the carrier gas; an apparatus 6 for atomizing an organo-transition metallic compound solution into fine droplets and feeding the droplets into passage 3 and a passage for feeding fine particles generated from the transition metallic compound in passage 3 into carbon fiber production furnace 4.

(25) The vapor grown carbon fiber production apparatus as described in (23) or (24) above, which further comprises a mechanism for mixing under stirring subsequent to the mixing passage.

(26) The vapor grown carbon fiber production apparatus as described in (25) above, wherein the mechanism for mixing under stirring is a line mixer 31.

(27) The vapor grown carbon fiber production apparatus as described in any one of (23) to (26) above, which further comprises funnel-shaped pipe 32 at a position upstream to carbon fiber production furnace 4.

(28) The vapor grown carbon fiber production apparatus as described in (27) above, wherein the funnel-shaped pipe assumes a form such-that the area of its longitudinal cross-section increases toward the carbon fiber production furnace.

(29) The vapor grown carbon fiber production apparatus as described in any one of (23) to (27) above, which further comprises a distributor 33 at a gas mixture inlet of carbon fiber production furnace 4.

(30) The vapor grown carbon fiber production apparatus as described in any one of (23) to (27) above, wherein the mixing passage and the carbon fiber production furnace are formed from ceramic.

(31) The vapor grown carbon fiber production apparatus as described in (29) above, wherein the ceramic contains at least one compound selected from among boron nitride, silicon carbide, and silicon nitride.

(32) A resin composition comprising a resin and the vapor grown carbon fiber as described in (19) or (21) above.

DETAILED DESCRIPTION OF THE INVENTION

Figure 1:
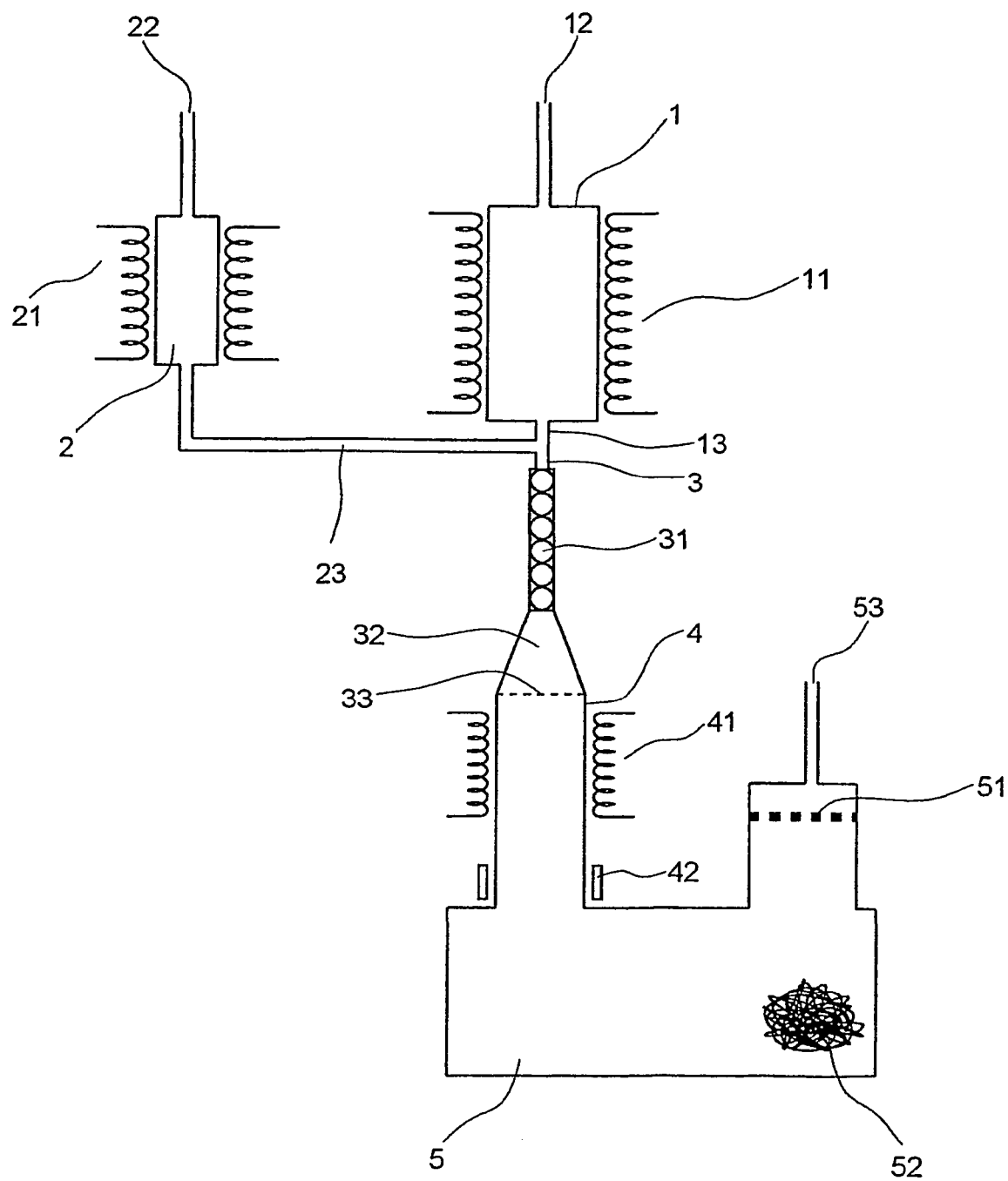
FIG. 1 is a schematic representation showing an embodiment of a carbon fiber production apparatus of the present invention.

First, the present invention is described in detail with respect to the first method for producing vapor grown carbon fiber, the vapor grown carbon fiber produced by the method, and an apparatus for producing the vapor grown carbon fiber by the method.

The materials employed for producing the vapor grown carbon fiber (hereinafter simply referred to as "carbon fiber") of the present invention are an organic compound and an organo-transition metallic compound. Examples of the organic compound include aromatic compounds such as benzene and toluene; linear hydrocarbons; and alicyclic hydrocarbons. Of these, aromatic compounds are preferred, and benzene is most preferred. These organic compounds may be used in combination of two or more species. A mixture of an aromatic compound and acetylene, ethylene, or butadiene is preferred. This is because, since thermal decomposition of an anti-aromatic unsaturated compound such as acetylene, ethylene, or butadiene generates a large amount of heat, reaction temperature can be elevated by heat generated from a raw material containing the hydrocarbon, thereby promoting decomposition of the aromatic compound. However, formation of carbon fiber from acetylene, ethylene, or butadiene is more difficult than that from an aromatic compound. Therefore, the amount of a gas of the hydrocarbon in a raw material is preferably 90 mass % or less, more preferably 70 mass % or less, and still more preferably 50 mass % or less.

Examples of the organo-transition metallic compound include ferrocene and nickelocene.

These raw materials are employed in a gas form. Therefore, a raw material which does not assume a gas form is evaporated through preliminary heating, or gasified through, for example, bubbling by use of a carrier gas. An organic compound and an organo-transition metallic compound may be separately gasified and then mixed together. Alternatively, the organo-transition metallic compound may be dissolved in the organic compound, and the resultant mixture gasified to thereby obtain a gas mixture. A raw material which assumes a gas form may be employed without application of heat, but, preferably, the raw material gas is preliminarily heated in order to reduce the amount of heat applied to a carbon fiber production furnace. The temperature of preliminary heating is preferably equal to or lower than the decomposition temperature of a raw material; for example, 100 to 450° C. The amount of an organo-transition metallic compound in a raw material gas is preferably 0.03 to 10 mass %.

A raw material gas is fed to a carbon fiber production furnace together with a carrier gas. A characteristic feature of the present invention resides in that a carrier gas is heated to high temperature, and the heated carrier gas and a raw material gas are mixed together before being fed to a carbon fiber production furnace. When a raw material gas is mixed with a carrier gas which has been heated to high temperature, the temperature of the raw material gas is raised. Therefore, even when the raw material is insufficiently heated, application of a large amount of heat to the carbon fiber production furnace is unnecessary. As a result, variation in temperature in the production furnace can be minimized. When a carrier gas and a raw material are mixed together in advance, uniformity of the resultant gas mixture can be attained in a carbon fiber production furnace. In contrast, in the case where a carrier gas and a raw material gas are fed separately through, for example, feed pipes, to a carbon fiber production furnace, when the area of the longitudinal cross section of the production furnace is relatively large, the ratio of these gasses becomes non-uniform in the production furnace.

Hydrogen gas or an inert gas such as nitrogen gas or argon gas may be employed as a carrier gas. Of these, hydrogen gas is most preferred.

When the heating temperature of a carrier gas is excessively low, a large amount of heat must be applied to a carbon fiber production furnace. Meanwhile, an upper limit is also imposed on the temperature of the production furnace, so that the heating temperature is preferably 700 to 1,600° C. The amount of a carrier gas to be employed is 20 to 400 mol on the basis of one mol of a raw material gas.

In order to mix a raw material gas with a heated carrier gas in advance, for example, outlet pipes of these gasses are connected to a gas inlet pipe of a carbon fiber production furnace, and the gasses are combined together in the inlet pipe. Through this technique, a substantially uniform gas mixture is obtained. In order to obtain a completely uniform gas mixture, the gasses which have been mixed together are forcedly stirred. In order to carry out forced stirring, for example, a line mixer, which is generally employed for flow mixing, is connected to the gas inlet pipe. Examples of the line mixer include a static mixer and a jet mixer. A static mixer has a structure including a tube in which elements of different shapes are provided. When a gas mixture is caused to flow through the tube, the gas is stirred by the effect of disturbing the gas flow in the tube, to thereby enhance uniformity of the gas mixture. A jet mixer has a structure where a gas to be mixed with another gas is blown out as a jet stream through a nozzle placed inside a tube, to be forced into stirring.

When a raw material gas is mixed with a heated carrier gas, at least a portion of an organo-transition metallic compound and an organic compound is decomposed in a gas inlet pipe or a line mixer, and transition metal particles are generated. As a result, production of carbon fiber may be initiated in the gas inlet pipe or the line mixer. However, since the flow rate of the gas mixture is high and the residence time of the gas mixture is short in the gas inlet pipe or the line mixer, only a small amount of carbon fiber is grown therein. Therefore, the resultant decomposed product is fed into a carbon fiber production furnace accompanied by the carrier gas, and a large amount of carbon fiber is produced in the production furnace.

When a gas mixture of a raw material gas and a heated carrier gas is fed directly into a carbon fiber production furnace through an inlet pipe, channeling of the gas mixture may occur in the production furnace, or the gas mixture may fail to become uniform in the production furnace. Therefore, the below-described funnel-shaped pipe and/or gas distributor are preferably provided subsequent to the inlet pipe.

The temperature of the inside of a carbon fiber production furnace (carbon fiber production zone) is generally 700 to 1,600° C. In the present invention, since a carrier gas is heated to high temperature, the average residence time of a raw material gas in the furnace may be shorter as compared with a typical method; i.e., the average residence time is about 0.5 to about 5 seconds. Therefore, the resultant carbon fiber has a smaller diameter.

Carbon fiber produced in a carbon fiber production furnace is collected in a collecting apparatus. The resultant crude carbon fiber contains a by-product such as a non-fibrous carbide. Since non-fibrous carbides can be selectively oxidized, they can be removed by conducting an oxidation process such as air-oxidation followed by purging the resulted carbon monoxide, carbon dioxide and the like from the system. If desired, the resultant carbon fiber is subjected to heat treatment, to thereby obtain a final product.

Most of the resultant carbon fiber (e.g., 90 mass % or more of the carbon fiber) has a diameter of 0.001 to 0.5 μm and an aspect ratio (length/diameter) of 10 to 15,000. The diameter, etc. of the carbon fiber can be regulated by varying the residence-time and the temperature of a raw material gas in a carbon fiber production furnace, or by varying the composition of a raw material gas. According to the present invention, variation in carbon fiber production conditions in the production furnace can be minimized, and thus carbon fiber having a uniform diameter can be produced.

The carbon fiber production apparatus of the present invention will next be described.

FIG. 1 is a schematic representation showing an embodiment of the apparatus of the present invention. FIG. 1 shows arrangement of furnaces of the apparatus.

In FIG. 1, reference numeral 1 represents a carrier gas heating furnace. The carrier gas heating furnace is formed of, for example, heat-resistant metal or ceramic, and typically assumes a hollow-cylindrical shape. A heater 11 is provided around the heating furnace 1. The heating furnace is preferably heated to 700 to 1,600° C. by use of the heater 11. A carrier gas is fed through a feed pipe 12 into the heating furnace.

A raw material gas (a gas containing an organic compound and an organo-transition metallic compound) is fed through a feed pipe 22 into a preliminary heating furnace 2. The preliminary heating furnace 2 is formed from iron, stainless steel, etc., and typically assumes a hollow-cylindrical shape. A heater 21 is provided around the preliminary heating furnace 2. Preferably, the raw material gas is preliminarily heated to 100 to 450° C. by use of the heater 21.

The preliminarily heated raw material gas is discharged through a discharge pipe 23 of the preliminary heating furnace, and the heated carrier gas is discharged through a discharge pipe 13 of the heating furnace. The discharge pipe 23 and the discharge pipe 13 are connected together to form a mixing passage, and the connection portion is connected to a gas mixture feed pipe 3 of a carbon fiber production furnace. Reference numeral 31 represents a mechanism for mixing gas under stirring, such as a line mixer. In particular, the mechanism 31 is provided when reliable mixing of gas is required. A static mixer, which is a type of line mixer, has a structure including a tube in which elements of different shapes are provided. When a gas mixture is caused to flow through the static mixer, uniformity of the gas mixture is enhanced by the effect of disturbing the gas flow in the tube.

Examples of the static mixer which may be employed include a Kenics mixer, a Komax mixer, a Sulzer mixer, a Toray Hi-mixer, and a Lightnin mixer (see The Society of Chemical Engineers, Japan ed., Chemical Engineering Handbook, 6th Edition, pp. 452-453, Maruzen).

In the case where the gas mixture is fed into carbon a fiber production furnace 4, when the gas mixture is fed through discharge pipe 23 or the line mixer directly into production furnace 4, channeling of the gas may occur in the production furnace, or the concentration of the raw material may fail to become uniform throughout the interior of the production furnace. In order to avoid such a problem, preferably, a funnel-shaped pipe 32 is provided at a position upstream to the carbon fiber production furnace. The funnel-shaped pipe assumes the form of a truncated cone, and the diameter of the pipe increases toward the production furnace. Therefore, when the gas flows through the funnel-shaped pipe, the gas is diffused radially and fed into the production furnace. Reference numeral 33 represents a distributor having numerous through-holes. Distributor 33 is preferably provided subsequent to the funnel-shaped pipe for feeding the gas uniformly into the furnace.

Carbon fiber production furnace 4 typically assumes a hollow-cylindrical shape. Furnace 4 may be formed from heat-resistant metal or ceramic (e.g., cordierite, zircon, alumina, glass-ceramics, zirconium carbide, silicon carbide, boron carbide, titanium carbide, tungsten carbide, silicon nitride, boron nitride, or glass). Preferably, furnace 4 is formed from a pressure-sintered product, a pressureless-sintered product, a reaction-sintered product, or a deposition product of boron nitride, silicon carbide, or silicon nitride. A heater 41 is provided around production furnace 4, and is employed for regulating the temperature of the furnace. The temperature of the production furnace is typically regulated to 700 to 1,600° C. Reference numeral 42 represents a cooling apparatus. If desired, cooling apparatus 42 is provided for promoting cooling of the produced carbon fiber.

The produced carbon fiber falls into a collecting apparatus 5. Carbon fiber adhering to the inner wall of the production furnace is intermittently scraped off the wall, and collected into collecting apparatus 5. A bag filter 51 is provided in collecting apparatus 5, and is employed for separation of gas from carbon fiber 52 and the like (other hydrocarbon compounds). The gas is discharged through a discharge pipe 53, and then subjected to any subsequent treatment or collected.

Next, the present invention is specified in detail with respect to the second method for producing vapor grown carbon fiber, the vapor grown carbon fiber produced by the method, and an apparatus for producing the vapor grown carbon fiber by the method.

A characteristic feature of the second method for producing vapor grown carbon fiber of the present invention resides in that a solution containing a transition metallic compound is atomized into droplets, a solvent is evaporated from the droplets to thereby form fine particles of the transition metallic compound, and the resultant fine particles are fed into a reaction furnace.

The transition metallic compound may be an inorganic or organic transition metallic compound. Examples of such a transition metallic compound include oxides, hydroxides, sulfides, fluorides, fluoro-complexes, chlorides, chloro-complexes, bromides, iodides, perchlorates, nitrates, sulfate double salts, carbonates, cyano-complexes, and metallocenes of iron, nickel, cobalt, molybdenum, platinum, palladium, rhodium, ruthenium, titanium, or vanadium. Specific examples include $FeF_2$, $FeCl_2$, $FeCl_3$, $FeSO_4$, $FeNO_3$, $Fe(CO)_5$, $Fe(C_5H_5)_2$, $FeS$, $FeS_2$, $NiCl_2$, $K_3[NiF_6]$, $K_3[CoF_6]$, $MoCl_2$, $RhCl_2$, $RuCl_2$, and $TiCl_4$. These transition metallic compounds may assume the form of an anhydrate or a hydrate. Of these compounds, many compounds other than chlorides of iron, ferrocene, etc. are difficult to evaporate, or have thermal decomposition temperatures lower than their evaporation temperatures. Therefore, the compounds cannot be gasified and fed into a reaction furnace. Thus, the compounds are particularly useful in the present invention.

The aforementioned transition metallic compound is thermally decomposed in a reaction furnace to thereby form fine particles of the transition metal. Alternatively, the transition metallic compound is reduced by hydrogen gas serving as a carrier gas, which is typically present in a reaction furnace, to thereby form fine particles of the transition metal.

In the present invention, two or more transition metallic compounds may be used in combination. Particularly, two or more transition metallic compounds having different thermal decomposition temperatures or different temperatures of hydrogen-induced reduction are preferably used in combination. When such transition metallic compounds are used in combination, formation of fine particles of the transition metal within a narrow zone of a reaction furnace can be prevented; i.e., fine particles of the transition metal can be formed throughout the reaction furnace, thereby enhancing utilization efficiency of the fine particles.

There are two methods for using two or more transition metallic compounds in combination. In one method, two or more transition metallic compounds are dissolved in a solvent, and the resultant solution is atomized into droplets. In this case, each of the droplets contains the two or more transition metallic-compounds having different thermal decomposition temperatures or different temperatures of hydrogen-induced reduction (the two types of temperatures will be simply referred to as "thermal decomposition temperatures, etc."). In the other method, solutions of two or more transition metallic compounds having different thermal decomposition temperatures, etc. are atomized into two or more types of droplets, and the resultant droplets are fed into a reaction furnace.

In the present invention, no particular limitation is imposed on the amount of a transition metallic compound present in a solvent employed for forming droplets. However, when the amount of the compound is excessively small, the amount of fine particles of the compound to be formed decreases, whereas when the amount of the compound is excessively large, the resultant fine particles tend to become large. Therefore, the amount of the compound is appropriately 0.01 to 40 mass %, preferably 0.1 to 30 mass %, more preferably 1 to 15 mass %.

Any solvent may be employed to form droplets, so long as the solvent can dissolve a transition metallic compound. Examples of the solvent which may be employed include water, organic solvents, and water-containing organic solvents. Preferred examples of the solvent include water, alcohols, aromatic compounds, ketones, ethers, and chain hydrocarbons. Specific examples include water, methanol, ethanol, propanol, benzene, hexene, toluene, xylene, acetone, ether, and hexane. These solvents may be employed singly or in combination of two or more species. Typically, an inorganic transition metallic compound is dissolved in water, and an organo-transition metallic compound is dissolved in an organic solvent.

A solution containing a transition metallic compound may be atomized into droplets by means of a known method such as a pressure atomization method, a two-fluid atomization method, a centrifugal atomization method, a vibration method, an ultrasonic method, an acoustic atomization method, or an electrical atomization method. Examples of the apparatus employed for such a method include an air-jet atomizer, a Raskin nozzle, a spray nozzle, and an ultrasonic atomizer. By use of such an apparatus, the smallest possible droplets should be formed.

In order to form very fine droplets, an air-jet atomizer is preferably employed. Droplets are formed in an atmosphere of nitrogen gas, helium gas, argon gas, or hydrogen gas.

In general, droplets of several microns or less tend not to gravitate, due to the effect of Brownian movement, and thus the droplets are not easily aggregated. In the present invention, in order to form fine particles of a transition metallic compound having a desirable diameter, the amount of the transition metallic compound in a solution and the size of droplets to be formed must be regulated. The size of droplets can be regulated by varying the type of an atomization apparatus. For example, in the case where fine particles of ferrous sulfate are formed, when a 10 mass % ferrous sulfate aqueous solution is atomized into droplets by use of an atomization apparatus for forming droplets of 0.3 to 0.8 μm, such as a constant-output atomizer, ferrous sulfate fine particles of about 50 to about 140 nm can be formed. In this case, when a 5 mass % ferrous sulfate aqueous solution is employed, ferrous sulfate fine particles of about 40 to about 110 nm can be formed.

Fine particles of a transition metallic compound may be obtained through evaporation of a solvent in droplets containing the compound. The solvent can be evaporated by causing the droplets to pass through, for example, a heated tube. In the case of production of vapor grown carbon fiber, typically, hydrogen gas serving as a carrier gas is preliminarily heated. Therefore, when the droplets are mixed with the heated carrier gas, the solvent in the droplets is effectively evaporated by heat of the carrier gas. Fine particles of the transition metallic compound are formed through evaporation of the solvent, and the resultant particles are dispersed in the gas. Since the fine particles are of very small size, they do not precipitate. In addition, the fine particles are not thermally decomposed at a temperature at which the solvent is evaporated, and the particles do not aggregate. Since the droplets are of substantially uniform size, the resultant fine particles are of uniform size, and particle size exhibits narrow distribution.

Subsequently, the resultant fine particles are fed into a reaction furnace together with an organic compound serving as a raw material. Preferably, the gas in which the fine particles are dispersed, the carrier gas, and the organic compound serving as a raw material are sufficiently mixed in, for example, a line mixer, and then fed into the reaction furnace. Hydrogen gas, which is typically employed as a carrier gas, is preliminarily heated to about 200 to about 400° C.

The organic compound may be a compound which is typically employed as recited in the first method for producing vapor grown carbon fiber. Examples of the organic compound include aromatic hydrocarbons such as benzene, toluene, xylene, naphthalene, and phenanthrene; alicyclic hydrocarbons such as cyclopropane, cyclopentene, and cyclohexane; chain hydrocarbons such as methane, ethane, acetylene, butadiene, and ethylene; an oxygen-containing compounds such as methanol and ethanol; and mixtures thereof. Of these, benzene, toluene, cyclohexane, acetylene, butadiene, or ethylene is preferred, and benzene is particularly preferred.

The amount of a carrier gas is preferably about 30 to about 60 mol on the basis of one mol of an organic compound. The amount of fine particles of a transition metallic compound is about 1 to about 10 mass % on the basis of the entirety of an organic compound.

The reaction furnace is typically heated to 1,000 to 1,500° C. At this temperature, an organic compound is thermally decomposed, and fine particles of a transition metallic compound are thermally decomposed or reduced by hydrogen, to thereby form fine particles of the transition metal. When the organic compound is decomposed, carbon atoms and carbon clusters are generated. Subsequently, through extension of the carbon clusters, carbon fiber is formed around the fine particles serving as nuclei. When the thermal decomposition temperature of the transition metallic compound is low, the compound is decomposed and fine particles of the transition metal are formed in the vicinity of the inlet of the reaction furnace. However, since carbon clusters for forming carbon fiber are insufficiently supplied in the vicinity of the inlet, the amount of the resultant carbon fiber is small, leading to low yield of carbon fiber. Since excess fine particles and clusters of the transition metal, which have not been consumed as catalyst at the inlet of the reaction furnace, are grown and become large, they cease to function as catalyst at the downstream zone of the reaction furnace at which carbon clusters are sufficiently supplied. Therefore, in order to increase the amount of carbon fiber to be formed and enhance the yield of carbon fiber, preferably, fine particles and clusters of a transition metal are formed throughout the reaction furnace. In order to form fine particles and clusters of a transition metal throughout the reaction furnace, a plurality of transition metallic compounds having different thermal decomposition temperatures, etc. are effectively employed.

In the present invention, since a transition metallic compound is fed into a reaction furnace in the form of fine particles, percent decomposition of the compound is low in the vicinity of the inlet of the reaction furnace, as compared with the case where a transition metallic compound is fed into the reaction furnace in the form of a gas (molecule). Therefore, fine particles of the transition metal are desirably formed throughout the reaction furnace.

The method of the present invention may be employed in combination with a conventional method for forming fine particles of a transition metal. For example, when the method of the present invention is employed in combination with a method in which ferrocene is dissolved in a raw material (i.e., an organic compound serving as a carbon source), and then evaporated by utilization of its sublimability and fed into a reaction furnace, ferrocene and a transition metallic compound exhibiting no sublimability can be simultaneously fed into a reaction-furnace. When the conventional method and the method of the present invention are employed in combination, fine particles of a transition metal can be formed throughout a reaction furnace, resulting in enhancement of reaction yield. When the conventional method and the method of the present invention are employed in combination, the amount of a transition metallic compound which assumes the form of a gas is preferably one mol or less on the basis of one mol of a transition metallic compound contained in droplets, the amount of each of the compounds being the amount as reduced to the transition metal of the compound.

Carbon fiber produced through the above method typically has a diameter of 1 to 500 nm and a length of 0.5 to 100 μm.

BEST MODE FOR CARRYING OUT THE INVENTION

The present invention will next be described in more detail by way of Examples, but the Examples do not limit the present invention.

EXAMPLES 1-4

Carbon fiber was produced by use of an apparatus shown in FIG. 1. A carrier gas heating furnace, a carbon fiber production furnace, and a funnel-shaped pipe are formed from silicon carbide. A Kenics static mixer serving as a line mixer is formed from sintered silicon carbide, and has an inner diameter of 12.7 mm and a length of 260 mm. The funnel-shape pipe has a short diameter of 12.7 mm and a long diameter of 180 mm. Tests were performed by use of carbon fiber production furnaces having an inner diameter of 180 mm and different lengths. A distributor including numerous through-holes of 5 mm diameter was employed.

Ferrocene and a small amount of sulfur were dissolved in benzene, and the resultant solution was heated and gasified through bubbling by use of hydrogen gas, to thereby prepare a raw material gas. The resultant raw material gas was fed to a preliminary heating furnace. The proportions by mass of ferrocene, sulfur, and benzene in the raw material gas are 3.5:0.1:96.4. Hydrogen gas was employed as a carrier gas. The resultant carbon fiber was collected in a collecting apparatus 5, and separated, through oxidation, into a fibrous product and a non-fibrous product such as soot. The yield of the carbon fiber was obtained on the basis of the conversion of carbon contained in benzene and ferrocene into the carbon fiber. The average size of the carbon fiber was measured on the basis of an electron micrograph of the fiber.

The test conditions and results are shown in Table 1.

TABLE 1

|  | Ex. 1 | Ex. 2 | Ex. 3 | Ex. 4 |
| --- | --- | --- | --- | --- |
| Carrier gas heating furnace |  |  |  |  |
| Temperature (° C.) | 1300 | 1300 | 1300 | 1300 |
| Hydrogen gas flow rate (NL/min.) | 140 | 140 | 140 | 140 |
| Raw material preliminary heating furnace |  |  |  |  |
| Temperature (° C.) | 400 | 400 | 400 | 400 |
| Hydrogen gas flow rate (NL/min.) | 20 | 20 | 20 | 20 |
| Raw material feed rate (g/min.) | 10 | 10 | 10 | 80 |
| Carbon fiber production furnace |  |  |  |  |
| Furnace length (mm) | 2100 | 1050 | 490 | 2100 |
| Temperature (° C.) | 1200 | 1200 | 1200 | 1200 |
| Gas residence time (second) | 4 | 2 | 1 | 4 |
| Results |  |  |  |  |
| Yield (%) | 25 | 15 | 10 | 50 |
| Average fiber size (diameter) (μm) | 0.05 | 0.04 | 0.03 | 0.15 |

(Little variation was observed in fiber size)

EXAMPLE 5

Figure 2:
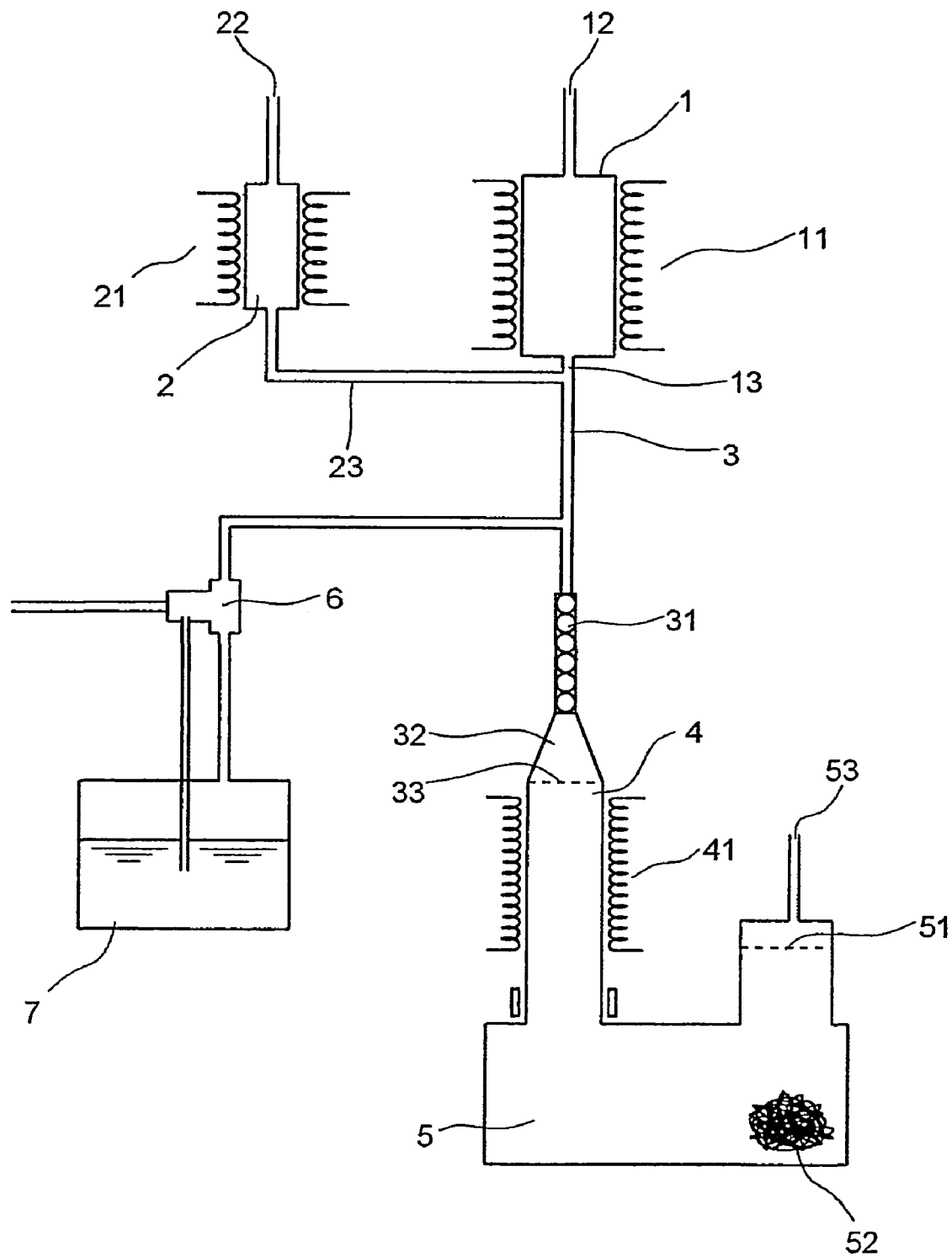
FIG. 2 is a schematic representation showing another embodiment of a carbon fiber production apparatus of the present invention.

Carbon fiber was produced by use of an apparatus as shown in FIG. 2. In FIG. 2, reference numeral 1 represents a carrier gas heating furnace, 2 an organic compound heating furnace, 4 a reaction furnace (reaction tube), 32 a funnel-shaped pipe whose diameter increases toward the reaction tube, and 33 a distributor having numerous pores. Distributor 33 and funnel-shaped pipe 32 are provided for uniformly feeding gas into the reaction tube. Reference numeral 5 represents a collecting apparatus, 6 an atomization apparatus, and 7 a bath for storing a solution of a transition metallic compound. Reference numerals 11, 21, and 41 represent heaters for heating the corresponding furnaces to predetermined temperatures. Benzene serving as a raw material of carbon fiber was fed through an inlet 22. Hydrogen serving as a carrier gas was fed through a hydrogen gas inlet 12. Ferrous sulfate and ferric chloride were employed as transition metallic compounds. An aqueous solution of these compounds was prepared, and the solution was atomized into droplets by use of the atomization apparatus and nitrogen gas serving as a driving source. The resultant droplets, the heated carrier gas, and the raw material gas were instantaneously mixed in a line mixer 31.

Carbon fiber 52 produced in the reaction tube 4 was collected by use of a filter 51 of collecting apparatus 5. The carrier gas was discharged through a gas discharge outlet 53.

The test conditions and results are as follows.

(1) Carrier Gas Heating Furnace

Temperature: about 300° C.

Hydrogen gas feed rate: 150 L/min. (standard conditions: 0° C., 1 atmosphere)

(2) Organic Compound Heating Furnace

Organic compound: benzene

Temperature: about 300° C.

Organic compound feed rate: 10 g/min.

(3) Atomizing Apparatus

Constant-output atomizer (MODEL 3076, product of KANOMAX JAPAN INC.)

Droplet: an aqueous solution of ferrous sulfate and ferric chloride

Concentration of the aqueous solution: ferrous sulfate (4 mass %), ferric chloride (4 mass %)

Droplet feed rate: $0.6 \times 10^{-3}$ L/min.

Droplet size: about 0.3 μm (as measured by use of a microscope, number average particle size)

Feed rate of nitrogen serving as a driving source: 3.5 L/min. (2.5 kg/cm$^2$G)

(4) Reaction Conditions

Length of the reaction furnace: 2,300 mm

Reaction temperature: about 1,200° C. (maximum temperature)

Reaction time: 1 sec. (average residence time in the reaction tube)

(5) Results

Amount of produced carbon fiber: 0.92 g/min. (yield*: 10%)

Shape of carbon fiber: average size(diameter) 0.03 μm, average length 15 μm (* The yield of carbon fiber was calculated on the basis of carbon contained in benzene.)

EXAMPLE 6

The procedure of Example 5 was repeated, except that ferrocene (0.5 mass %) was dissolved in benzene, and a transition metallic compound aqueous solution containing only ferrous sulfate (7 mass %) was employed, to thereby produce carbon fiber.

Results

Amount of produced carbon fiber: 0.74 g/min. (yield: 8%)

Shape of carbon fiber: average size(diameter) 0.03 μm, average length 15 μm

INDUSTRIAL APPLICABILITY

According to the first method of the present invention, uniformity in carbon fiber production conditions in a carbon fiber production furnace can be enhanced, and thus carbon fiber having a uniform diameter can be produced. Furthermore, since the residence time of a raw material in the production furnace can be minimized, the resultant carbon fiber can be reduced in size(diameter). In addition, the yield of the carbon fiber can be improved.

According to the second method of the present invention, a variety of transition metallic compounds can be employed, and inexpensive inorganic compounds can be employed. Furthermore, the yield of carbon fiber on the basis of a transition metallic compound and an organic compound serving as a raw material can be improved as compared with the case where carbon fiber is produced through a conventional method In addition, carbon fiber having a diameter smaller than that of conventional carbon fiber and being of uniform diameter can be produced.

The invention claimed is:

1. A method for producing vapor grown carbon fiber using an organo-transition metallic compound as a catalyst and an organic compound as a carbon source, comprising heating a carrier gas to a temperature of 700 to 1600° C., mixing the heated carrier gas with a raw material gas containing the organic compound as a carbon source or with a raw material gas containing the organo-transition metallic compound and the organic compound, and then introducing the resultant gas mixture containing the heated carrier gas into a carbon fiber production zone.

2. The method for producing vapor grown carbon fiber as claimed in claim 1, comprising mixing a heated carrier gas and a raw material gas containing an organic compound and an organo-transition metallic compound serving as raw materials of carbon fiber; and introducing the resultant gas mixture into a carbon fiber production zone.

3. The method for producing vapor grown carbon fiber as claimed in claim 2, wherein the carrier gas and the raw material gas are mixed under stirring.

4. The method for producing vapor grown carbon fiber as claimed in claim 2, wherein the raw material gas is preliminarily heated to 100 to 450° C.

5. The method for producing vapor grown carbon fiber as claimed in claim 3, wherein the raw material gas and the carrier gas are mixed under stirring by use of a line mixer.

6. The method for producing vapor grown carbon fiber as claimed in claim 2, wherein the organic compound is an aromatic compound.

7. The method for producing vapor grown carbon fiber as claimed in claim 2, wherein the organic compound is a mixture of an aromatic compound and acetylene, ethylene, or butadiene.

8. The method for producing vapor grown carbon fiber as claimed in claim 7, wherein the amount of acetylene, ethylene, or butadiene is 90 mass % or less.

9. A method for producing vapor grown carbon fiber using an organo-transition metallic compound as a catalyst and an organic compound as a carbon source, comprising dissolving a transition metallic compound in a solvent; atomizing the resultant solution into fine droplets; evaporating the solvent in the droplets to thereby obtain fine particles of the transition metallic compound; and feeding the fine particles into a carbon fiber production zone together with a gas of an organic compound, with the particles being dispersed in the gas, and wherein the gas of the organic compound is formed by heating a carrier gas, and mixing the heated carrier gas with a raw material gas containing the organic compound as a carbon source.

10. The method for producing vapor grown carbon fiber as claimed in claim 9, wherein the feeding of the fine particles into a carbon fiber production zone together with a gas of an organic compound further comprises feeding the fine particles into the carbon production zone with a gas of a transition metallic compound, with the particles being dispersed in the gasses of the organic compound and transition metallic compound.

11. The method for producing vapor grown carbon fiber as claimed in claim 9, wherein each of the droplets contains two or more transition metallic compounds having different thermal decomposition temperatures or different temperatures of hydrogen-induced reduction.

12. The method for producing vapor grown carbon fiber as claimed in claim 9, wherein the droplets comprise two or more types of droplets containing transition metallic compounds having different thermal decomposition temperatures or different temperatures of hydrogen-induced reduction.

13. The method for producing vapor grown carbon fiber as claimed in claim 9, wherein the amount of the transition metallic compound in each of the droplets (or the total amount of two or more transition metallic compounds in each of the droplets) is 0.01 to 40 mass %.

14. The method for producing vapor grown carbon fiber as claimed in claim 9, wherein the transition metallic compound is one species selected from among an oxide, a hydroxide, a sulfide, a fluoride, a fluoro-complex, a chloride, a chloro-complex, a bromide, an iodide, a perchlorate, a nitrate, a sulfate double salt, a carbonate, a cyano-complex, and a metallocene of iron, nickel, cobalt, molybdenum, platinum, palladium, rhodium, ruthenium, titanium, or vanadium.

15. The method for producing vapor grown carbon fiber as claimed in claim 9, wherein the transition metallic compound has a thermal decomposition temperature lower than its evaporation temperature.

16. The method for producing vapor grown carbon fiber as claimed in claim 9, wherein a method for atomizing the transition metallic compound solution into droplets is at least one species selected from among a pressure atomization method, a two-fluid atomization method, a centrifugal atomization method, a vibration method, an ultrasonic method, an acoustic atomization method, and an electrical atomization method.

17. The method for producing vapor grown carbon fiber as claimed in claim 9, wherein the solvent employed for dissolving the transition metallic compound is water, an organic solvent, or a water-containing organic solvent.

18. The method for producing vapor grown carbon fiber as claimed in any claim 9, wherein the solvent employed for dissolving the transition metallic compound is at least one species selected from among water, methanol, ethanol, propanol, benzene, toluene, xylene, acetone, ether, and hexane.

19. The method for producing vapor grown carbon fiber as claimed in claim 9, wherein the carrier gas is preheated to a temperature of 200° to 400° C.

* * * * *